Figure 2:
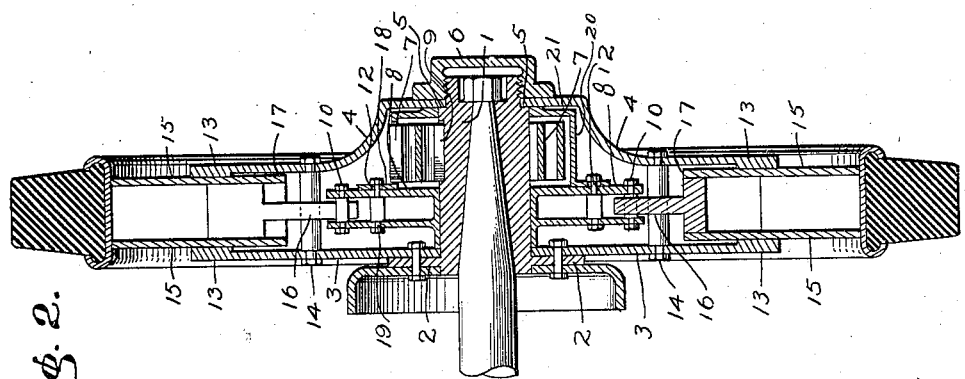

Oct. 9, 1923.
1,470,089

A. T. MALTBY

RESILIENT WHEEL FOR VEHICLES

Filed July 11, 1921

Inventor.
Arthur T Maltby

Patented Oct. 9, 1923.

1,470,089

UNITED STATES PATENT OFFICE.

ARTHUR T. MALTBY, OF CHICAGO, ILLINOIS.

RESILIENT WHEEL FOR VEHICLES.

Application filed July 11, 1921. Serial No. 483,754.

*To all whom it may concern:*

Be it known that I, ARTHUR T. MALTBY, a citizen of the United States, and a resident of Chicago, in the county of Cook and State of Illinois, have invented certain new and useful Improvements in Resilient Wheels for Vehicles, of which the following is a specification.

My invention relates to improvements in resilient wheels for vehicles in which a central hub member, adapted to be mounted upon the axle of a vehicle, supports two, spaced apart, circular side members, a rotary member mounted upon said central hub, and arranged to have a bearing and rotary motion thereon, a metallic spring having one end connected to said hub member and the other end to said rotary member, and a tread member circumferentially surrounding the peripheries of said side members, and arranged to have motion in relation thereto, and connected to said rotary member and to said side members in such manner that said hub member is held resiliently centered in relation to said tread member by the tension of said spring.

The object of this invention is, first, to provide a resilient wheel in which a circular, rigid ring, tread member is adapted to operate in conjunction with a central hub member, a rotary member, or rotator, mounted upon said hub, spaced apart side members and a metallic spring; second, to provide a rotator arranged to be mounted upon said central hub member and adapted to form suitable flexible connection with said rigid ring tread member; third, to provide suitable means for connecting said rigid ring tread member with said rotator and with said hub member and spring, in such manner that said hub is held in resilient operative relation to said tread member by the tension of said spring; fourth, to provide suitable means for maintaining operative relationship between the various members, and for conveniently assembling and demounting the same; fifth, to provide a resilient wheel of simple durable construction, having few parts easily assembled and accessible.

These objects I accomplish by the use of a wheel body, embracing a central hub member equipped with two spaced apart circular side members, and a threaded nut on the outer end of said hub; by the use of a rotator mounted upon said central hub member and having a bearing and rotary motion thereon, said rotator provided with a plurality of connective contact members arranged around the periphery thereof, and having open space between said members; by the use of a metallic spring connected to said hub member and to said rotator, and means for adjusting the tension of said spring; by the use of a circular rigid ring tread member surrounding the peripheries of said side members, the inner portion of said tread member extending inward between said side members, and divided into a plurality of rigid arms, said arms arranged to have flexible contact connection with said rotator and with said side members; by the use of a plurality of stay bolts, through the medium of which said side members are held in rigid spaced apart relation to one another and said tread member is held in resilient operative relation to said central hub member opposed to the tension of said spring.

Figure 1:
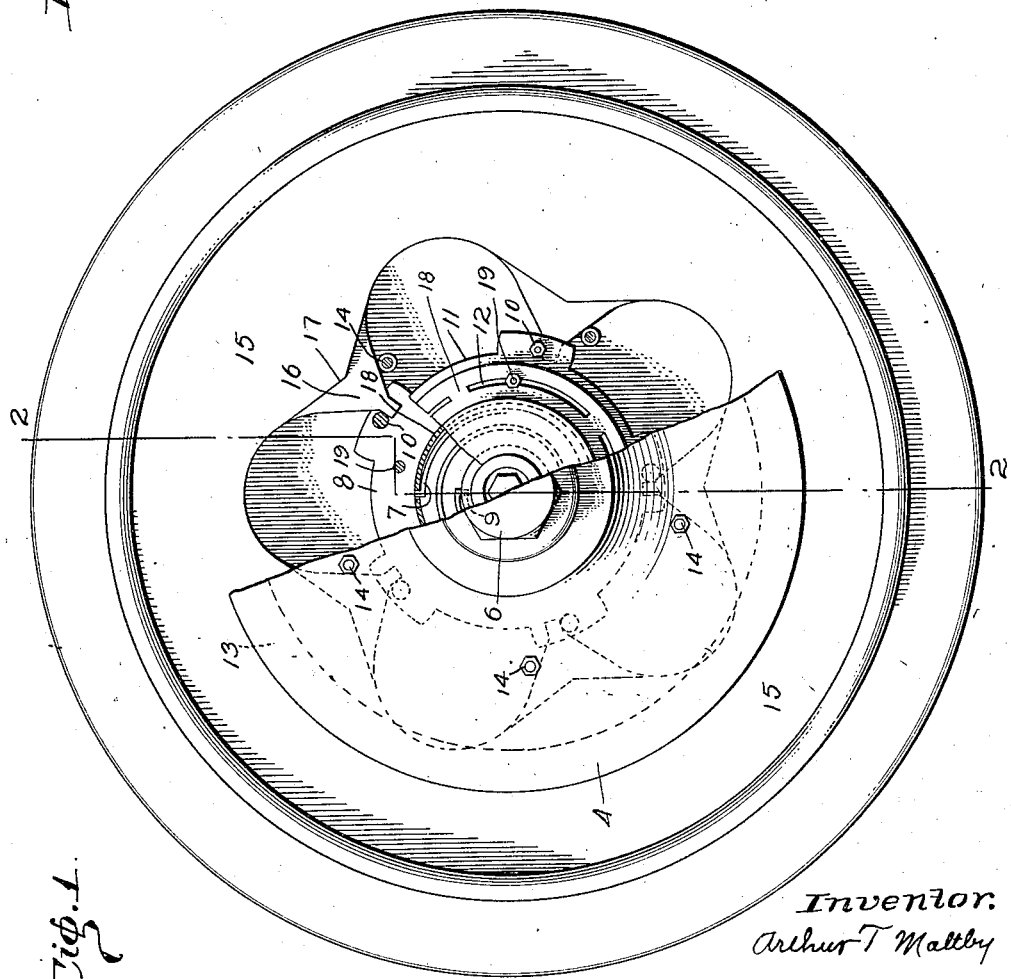

The invention is illustrated by the accompanying drawings in which Fig. 1 is a side elevation with a portion of a side member and of the rotator removed. Fig. 2 is a cross section of the wheel on the line A. B.

Referring to the drawing the numerals indicate the various parts throughout the various views.

The wheel body includes a central hub member and spaced apart circular side members supported thereon. The central hub member 1, is a cylindrical shell the opening through its axis adapted to receive a separate independent inner hub, or be mounted upon the axle of a vehicle direct, the inner end (toward the vehicle) of said hub having an integral outwardly projecting annular flange, 2, adapted to support the inner side member, 3, said side member having a central opening to fit over said hub member and bolted thereto through said flange, 2, the same bolts also serving to hold a brake drum. The outer end of said central hub member is arranged with a shoulder, 5, against which to receive the outer side member, 4, and said hub is also extended beyond said outer side member and said extension provided with a threaded nut, 6, which serves to hold said outer side member, 4, firmly in place against said shoulder. The middle portion of said hub, between said side members, is arranged to receive the spring, 7, and rotator, 8.

The spring is preferably of rectangular cross section, coiled spirally around said hub member, and having its inner end demountably secured to said hub, preferably by a hook, 9, the outer or movable end of said spring being connected to said rotator.

The rotator, 8, is located between said spring and said inner side member, centering on the wheel tread, and consists of two parallel spaced apart circular flanges with a common hub, having a central opening arranged to fit over the central hub member to form a bearing and permit rotary motion thereon, and a plurality of contact members 10, arranged transversely between said flanges at regular intervals around the peripheries thereof, said contact members designed to have contact bearing on the rigid arms projecting inward from the tread member, the open space between said contact members permitting said arms to pass inward toward the hub, when same is deflected. Sections of the peripheries of said flanges, centrally between said contact members, are cut away to a smaller diameter to form depressions, 11, consecutively around said peripheries, between said contact members, said depressions arranged to permit the inner ends of said rigid arms, in said tread member, to pass to operative position between said flanges. At an intermediate point on said rotator, means are provided for connecting to the outer movable end of said spring, said means consisting of a branch or addition 20 to said rotator extending horizontally across the outer periphery of said spirally coiled spring to the aforesaid outer side member, said branch having a flange, 21, thereon, extending downwardly between said outer side member and the outer edge of said spring to the hub member forming a bearing thereon, and around which it is arranged to rotate in unison with said rotator, to which it is secured by a flange 18 and bolts 19, said bolts working in slots, 12, in said flange to provide for adjusting the tension of said spring, said spring being attached by means of a hook to said branch of the rotator, said branch member being preferably formed so as to enclose said spring.

The side members, 3, 4, are circular metal disks, the outer peripheries of which are of such diameter as to allow the necessary space for the inward movement of the tread member, and to form the rigid wheel rim, 13, and said side members are held in rigid spaced apart relation one to the other by a plurality of stay bolts, 14, interposed between, thus providing the necessary space to accommodate the tread member, 15, and permit resilient movement of said tread member between them.

The stay bolts, 14, are preferably made in one piece with a shoulder and an extension of smaller diameter at each end, said extensions passing through holes in said side members and each of said extensions provided with a thread and nut which serve to clamp said side members against said shoulders provided by the larger intermediate portion of said bolts, said intermediate portion being of such length as to permit sliding abutment of said tread member, between said side members, and said intermediate portion of said stay bolts also serves, each individually, as a contact connection and guide for said tread member, in relation to said hub member.

The tread member, 15, is a continuous rigid ring circumferentially surrounding said side members, having on its outer periphery an encircling ring, or tire rim, adapted to hold a rubber tire or other suitable renewable tread wearing surface. The body of said tread member is arranged with parallel sides extending inward between the peripheries of the aforesaid side members, and having sliding abutment thereon. The inner portion of said tread member is provided with a plurality of regularly spaced rigid arms, 16, projecting radially inward to a common radius around said central hub member between the flanges of said rotator and somewhat beyond the contact members, 10, therein, each of said arms having contact connection with one of said contact members and also similar but opposing connection with one of the stay bolts, 14, located between said side members, and said rigid arms in said tread member are made thinner at their inner extremities, to permit their inward movement into the interior of the rotator, thereby forming projecting shoulders, 17, upon either side of said arms.

It will be seen that the wheel is made up primarily of three parts namely: a wheel body, a tread member, and an intermediary rotary member, or rotator, through which the tension of a spring operates to maintain resilient operative relation between said wheel body and said tread member.

It will also be seen that the tension of the spring is exerted through the wheel body to the stay bolts therein in one direction, and through the rotator to the contact members therein, in the opposite direction, and that each of the arms in the tread member is engaged by one of said stay bolts on the one face and one of said contact members on the opposite face, the effect of which tends to hold said wheel body, with its hub member resiliently centered in relation to said tread member, subject to the tension of said spring.

It will also be seen that with the arms of the tread member clamped between the stay bolts on one side, and the contact members on the other side, and the hub member centered in relation to said tread member, the tension of said spring is equalized between said arms, or neutral, when said hub is in said central position, and such a degree of tension may be maintained in said spring as may be required to meet operative conditions.

It will be seen further that with pressure applied to the central hub member, and said hub deflected from said central position, said pressure is transmitted to only one stay bolt and one rigid arm on the one hand, and to one contact member and one arm on the other hand, with said hub member resiliently suspended between these two supports, all other points of contact of said stay bolts and contact members with said arms being thereby relieved, and that this condition prevails in whatsoever direction said pressure may be applied.

It will also be seen that with the central hub member centered in relation to the tread member, the rigid arms in said tread extend inward somewhat beyond, and into the open space between, the contact members in the rotator, and that when said central hub member is deflected from said central position, said rigid arms in said tread member are projected farther inward into said open space between said contact members in said rotator, in the direction of, and proportionate to the degree of said deflection.

It will also be seen that the rigid arms in the tread member are so formed and arranged that the contact members in the rotator and the stay bolts in the side members, are guided under all conditions of deflection direction of rotation or spring tension, to receive contact with said rigid arms, each in proper relation respectively as the wheel revolves.

It will be seen that the demountable stay bolts perform several functions namely: hold the side members in proper relation to receive the tread member, provide contact connection for the arms of said tread member, permit demounting the outer one of the side members, and transmit the driving torque from the axle of a vehicle to the tread member when driving in one direction, said torque being transmitted through the spring and contact members when driving in the opposite direction.

It will also be seen that by the use of a tread member having rigid arms connecting directly with said wheel body and said rotator, the number of parts required is reduced to a minimum, and the various members are simple and easily assembled.

What I claim is:

1. The combination in a resilient wheel for vehicles, of a central hub member adapted to be mounted upon the axle of a vehicle, two circular spaced apart side members supported on said hub, said side members held in rigid spaced apart relation one to the other by demountable stay bolts, with open space between said side members extending to the interior of the wheel, a threaded nut on the outer end of said hub, a tread member consisting of a circular ring circumferentially surrounding said side members and having motion in relation thereto, the outer face of said tread member arranged to form an outer tread wearing surface, the body of said tread member extending inward between said side members and having sliding abutment thereon, the inner portion of said tread member provided with a plurality of rigid arms extending radially inward on either side of said stay bolts and having contact connection therewith, and means for holding said tread member in resilient operative relation to said central hub member, said means consisting of a metallic spring coiled spirally around said central hub member the inner end of said spring demountably secured to said central hub member, the outer movable end of said spring connected to a rotator, said rotator mounted upon said central hub member and arranged to have a bearing and rotary motion thereon, and also arranged for changing the tension of said spring in relation to said rotator and to said hub, said rotator having two spaced apart annular flanges, said flanges having depressions at intervals around the peripheries thereof, and a plurality of contact members mounted between said flanges, with open space between said members extending into the interior of said rotator, said contact members arranged to have contact connection with said rigid arms in said tread member, in such manner that said tread member is held in resilient operative relation to said central hub member subject to the tension of said spring, substantially as set forth.

2. In a device of the type specified the combination of a wheel body having a central hub member and spaced apart circular side members supported thereon, a circular rigid ring tread member circumferentially surrounding said side members and having motion in relation thereto, and means for resiliently connecting said tread member with said wheel body, said means including a rotator mounted upon said central hub member and arranged to have a bearing and rotary motion thereon, said rotator provided with a plurality of contact members arranged around the periphery thereof and having open space between said members, a metallic spring having one end connected to said wheel body and the other end connected to said rotator, a plurality of stay bolts mounted between said side members, a plurality of rigid arms extending radially inward from said tread member to a point within said open space between said contact members in said rotator said rigid arms arranged to have contact connection with said contact members in said rotator and with said stay bolts in said side members, in such manner that said tread member is held in resilient operative relation to said wheel body subject to the tension of said spring.

3. In a device of the type specified, a wheel body including a central hub member and spaced apart circular side members supported thereon, and a circular rigid ring tread member circumferentially surrounding said wheel body and having motion in relation thereto, said tread member provided with a plurality of rigid arms extending radially inward, said arms arranged to have flexible contact connection with said wheel body, having in combination therewith a rotator, said rotator mounted upon said central hub member and arranged to have a bearing and rotary motion thereon, said rotator provided with a plurality of contact members arranged around the periphery thereof, with open space between said members, and a metallic spring, said spring arranged to provide resilient tension between said wheel body and said rotator, and said contact members in said rotator arranged to have contact connection with said rigid arms in said tread member in such manner that said tread member is held in resilient operative relation to said wheel body subject to the tension of said spring.

4. In a device of the type specified, a wheel body including a central hub member and spaced apart circular side members supported thereon, a rotator mounted upon said hub and arranged to have a bearing and rotary motion thereon, and a metallic spring, said spring arranged to provide resilient tension between said wheel body and said rotator, having in combination therewith a circular rigid ring tread member circumferentially surrounding said wheel body and having motion in relation thereto, said tread member having a plurality of rigid arms extending radially inward, said arms arranged to have flexible connection with said wheel body and with said rotator in such manner that said tread member is held in resilient operative relation to said wheel body subject to the tension of said spring.

5. In a resilient wheel for vehicles the combination of a central hub member, spaced apart circular side members supported thereon, a circular rigid ring tread member circumferentially surrounding said side members and arranged to have motion in relation thereto, said tread member having a plurality of rigd arms extending radially inward, and means for holding the various members in operative relation to one another, said means including a plurality of stay bolts mounted between said side members, said bolts arranged to hold said side members in rigid spaced apart relation to one another, and also have contact connection with said rigid arms in said tread member, and a rotator and spring, said rotator mounted upon said central hub member and arranged to have a bearing and rotary motion thereon, said rotator provided with a plurality of contact members with open space between said members said spring arranged to provide resilient tension between said central hub member and said rotator, and said contact members in said rotator and said stay bolts in said wheel body arranged to have opposing contact connection with said arms in said tread member in such manner that said tread member is held in resilient operative relation to said central hub member by the tension of said spring.

6. In a device of the type specified the combination of a central hub member, spaced apart circular side members supported thereon, a plurality of stay bolts mounted between said side members, a circular tread member circumferentially surrounding said side members and having motion in relation thereto, said tread member provided with a plurality of rigid arms extending inward, and a rotator and spring, said rotator mounted upon said central hub member and arranged to have a bearing and rotary motion thereon, said spring arranged to provide resilient tension between said central hub member and said rotator, said rotator having a plurality of contact members arranged around the periphery thereof and having open space between said members, and said stay bolts in said side members and said contact members in said rotator and rigid arms in said tread member arranged to have connective contact with one another, in such manner that said central hub member is held resiliently centered in relation to said tread member, and that when said central hub member is deflected from said central position one or more of said rigid arms in said tread member, is projected into said open space between said contact members in said rotator, subject to the tension of said spring.

7. In a device of the type specified the combination of a central hub member arranged to be demountably secured to a separate independent inner hub, said central hub member having circular spaced apart side members supported thereon, a plurality of stay bolts mounted between said side members, a circular rigid ring tread member circumferentially surrounding said side members and having motion in relation thereto, and having a plurality of rigid arms extending radially inward, and a rotator and spring, said rotator mounted upon said central hub member and having a bearing and rotary motion thereon, said rotator provided with a plurality of contact members arranged around the periphery thereof and having open space between said members, said spring connected at one end to said central hub member and at the other end to a branch of said rotator, said branch adjustably connected to said rotator by means of a flange and bolts, and said contact members in said rotator, said stay bolts in said side members, and said rigid arms in said tread member, arranged to have contact connection with one another, in such manner that said central hub member is held in resilient operative relation to said tread member subject to the tension of said spring.

8. In a device of the type specified the combination of a wheel body and a circular rigid ring tread member, with a rotator and spring, said wheel body having a central hub member, said rotator mounted upon said hub and having a bearing and rotary motion thereon, said tread member having flexible connection with said wheel body and with said rotator in such manner that said tread member is held in resilient operative relation to said wheel body by the tension of said spring.

ARTHUR T. MALTBY.